United States Patent [19]

Van de Kerkof

[11] 4,135,265
[45] Jan. 23, 1979

[54] BEE HIVE

[76] Inventor: Herman Van de Kerkof, 4576 Cliffmont Rd., North Vancouver, British Columbia, Canada, V7G 1J9

[21] Appl. No.: 807,280

[22] Filed: Jun. 16, 1977

[51] Int. Cl.² .................. A01K 47/00; A01K 47/06
[52] U.S. Cl. .......................................................... 6/1
[58] Field of Search ................. 6/1, 2 R, 2 A, 4 A, 6/4 R

[56] References Cited

U.S. PATENT DOCUMENTS

| 82,372 | 9/1868 | Zimmerman | 6/2 R |
|---|---|---|---|
| 117,539 | 8/1871 | Henry | 6/2 R |
| 170,237 | 11/1875 | Colvin | 6/1 |
| 2,292,110 | 8/1942 | Evans | 6/1 |
| 2,709,820 | 6/1955 | Wahl | 6/1 |
| 3,408,668 | 11/1968 | Paoletti | 6/1 |

Primary Examiner—Russell R. Kinsey
Assistant Examiner—Robert P. Swiatek
Attorney, Agent, or Firm—Townsend and Townsend

[57] ABSTRACT

A bee hive having a bottom section including inclined boards extending upwardly from the front and rear walls to meet at about the center of the top of the side walls to define a first space beneath the boards and a second space above the boards. Internal vents in the side walls to permit air flow between the first space and the second space. At least one closeable vent in each side wall communicates the first space with the exterior of the bottom sections. At least one closeable vent in the rear wall communicates the second space with the exterior of the bottom section. A hive section having double walls is provided and the hive has a top section comprising (i) an inner cover that can be adapted to function as a feed and provides insulation; (ii) a reversible inner lid; and (iii) an outer lid. The hive permits wintering of bees in cold climates.

24 Claims, 8 Drawing Figures

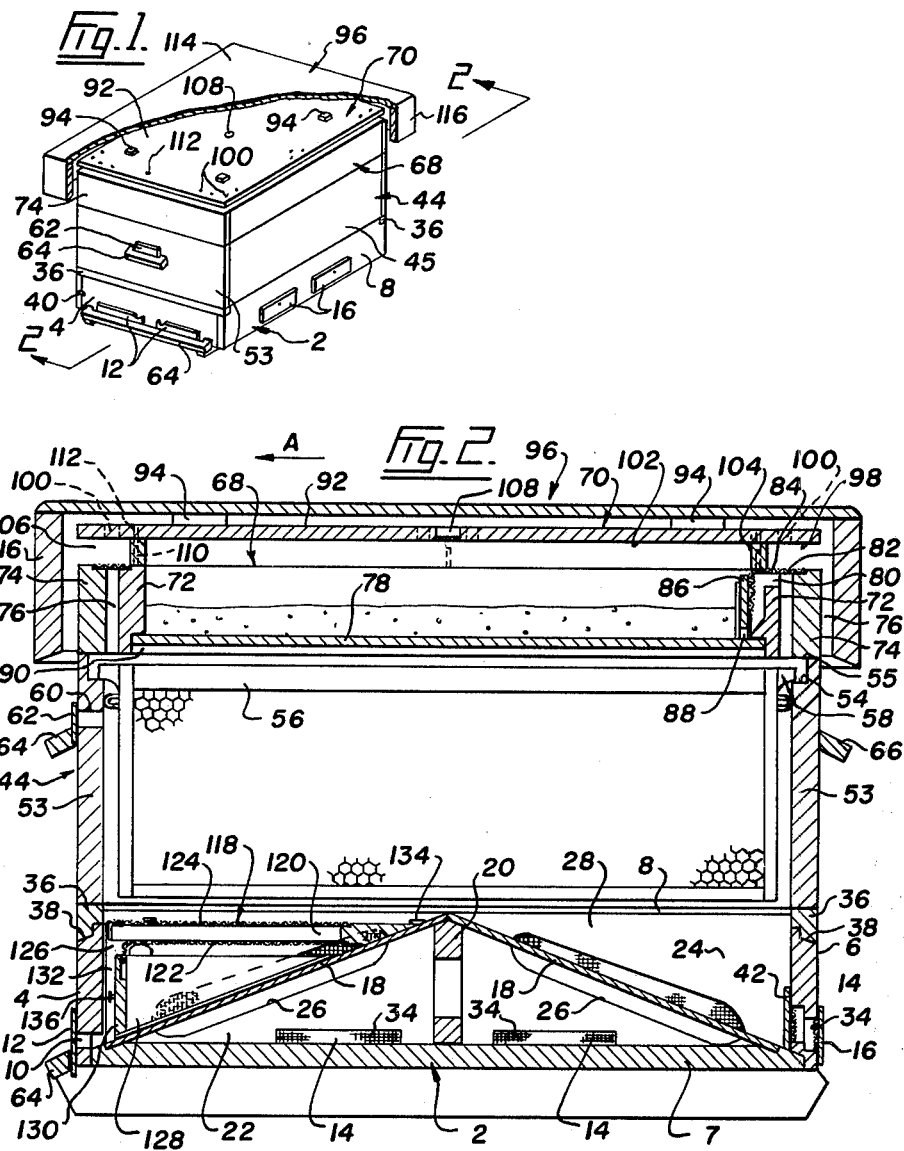

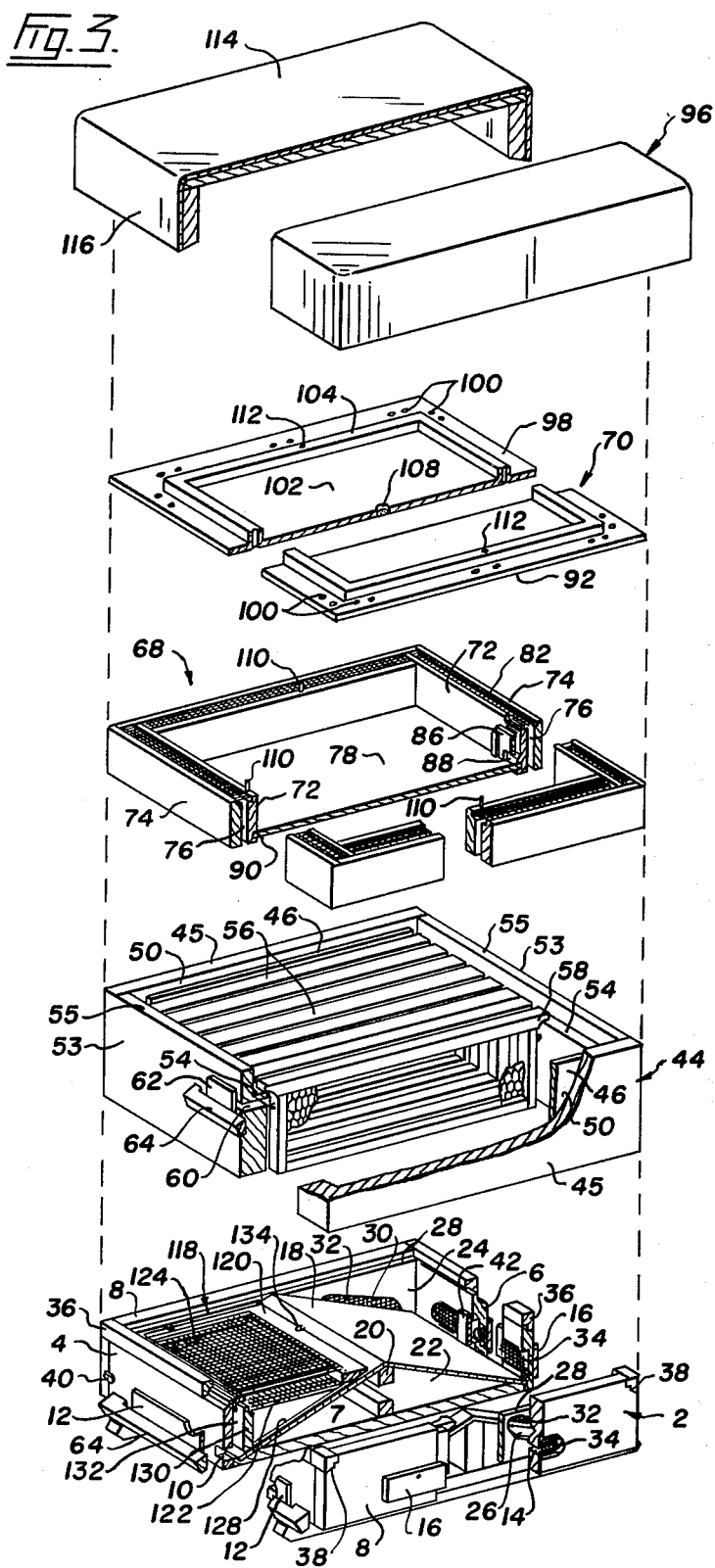

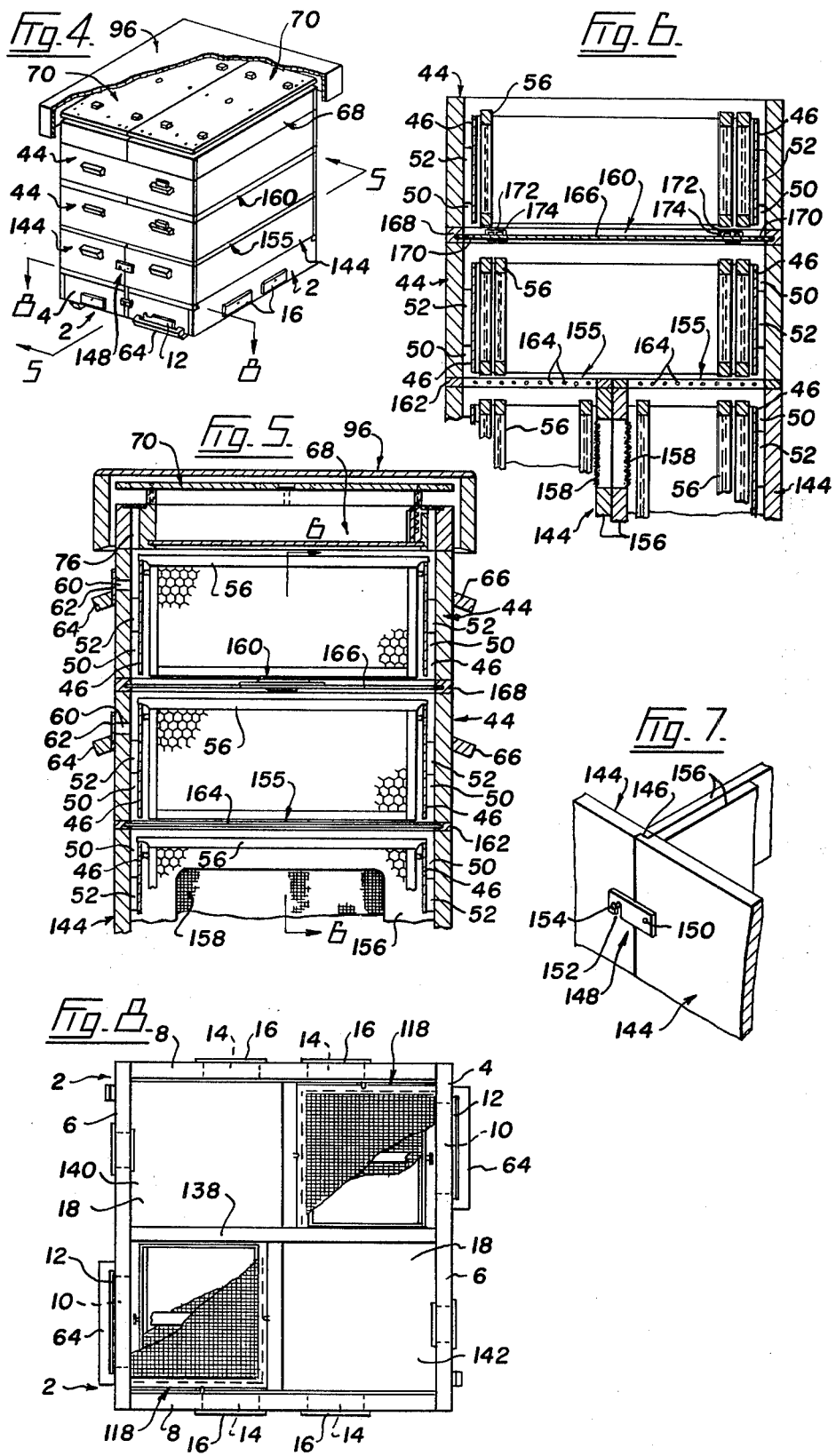

BEE HIVE

FIELD OF THE INVENTION

The present invention relates to a bee hive.

DESCRIPTION OF PRIOR ART

The keeping of bees is an extremely old branch of human endeavour. Hives of a wide variety of types have been constructed for many centuries. However, the most significant advance in beekeeping was in the last century with the invention of the Langstroth hive. This hive forms the basis of all modern bee hives although detail alterations have been made since Langstroth's original invention of the hive.

A known disadvantage of the Langstroth hive and its modern variations is poor ventilation. This is particularly important in colder climates such as the northern United Sates and Canada. It appears to be recognized that bees are, contrary to what was once believed, reasonably able to withstand the cold by the simple act of clustering, that is the gathering together of all bees. Thus cold itself is not a danger to bees but becomes a problem because of the condensation of moisture on the inside of the hives resulting from exterior cold and poor ventilation within the hive. As a result the inside of the hive becomes damp and bees are not able to resist dampness. In particular their food supply becomes damp, which encourages the growth of mold. A number of diseases to which the bee is susceptible can be related to the presence of dampness in a hive.

In view of the above difficulties it has been a common practice in colder climates to destroy the bee colonies before winter and to replace the colonies each spring with package bees. Clearly this is an expensive procedure. An alternative has been to apply insulation to the hives but this has not proved to be generally successful.

SUMMARY OF THE INVENTION

The present invention seeks to provide a bee hive that is well able to support colonies of bees throughout northern winters even in cold parts of the United States and Canada without any adverse effect on the health of the bees.

In particular the present invention seeks to provide a bee hive with excellent ventilation brought about by a combination of features as described below.

In a desirable aspect the present invention provides a two queen system in which the bee hive is, in effect, two bee hives side by side. The advantages of a two queen system are well documented but an effective, practical means of achieving the two queen system has been difficult, particularly in colder climates.

Accordingly, in a first aspect, the present invention is a bee hive comprising a bottom section having a removable front wall, a removable rear wall and two side walls; a closeable bee entrance in the front wall; inclined partitions extending upwardly from the front and rear walls to meet at about the center of the top of the side walls to define a first space beneath the partitions and a second space above the partitions; internal vents in the side walls to permit air flow between the first space and the second space; at least one closeable vent in each side wall to communicate the first space with the exterior of the bottom section; at least one closeable vent in the rear wall to communicate the second space with the exterior of the bottom section; a hive section having (a) inner and outer side walls spaced to define ventilation channels at the sides of the hive section and (b) end walls; means on said end walls in said hive section to suspend a plurality of bee hive frames; a closeable entrance in at least one end wall of said hive body secton; a top section comprising in combination; (i) an inner cover havng inner and outer walls to define an inner space and ventilation channels around its periphery to communicate with the hive section below, the channels at the sides of the inner cover aligning with the ventilation channels in the hive section below; a base in the inner cover adjacent the lower edges of the inner walls; (ii) a reversible inner lid comprising a flat board having first and second sides; projections formed on the first side; ventilation openings around the periphery of the lid to align with the channels in the inner cover; an upstanding wall formed on the second side to align with the inner walls on the inner cover below and to space said second side away from the inner cover to define ventilation openings at the top of the ventilation channels in the inner cover; (iii) an outer lid comprising a top having walls to define an area larger than the area of a side of the inner lid whereby the outer lid can be moved in the direction of the wind direction in order to facilitate ventilation, the outer lid being supported by the projections of the inner lid or the wall of said inner lid depending on the ventilation required.

It is desirable to provide an adjacent landing platform for each entrance.

The bee hive may include a pollen trap associated with the bottom section. The collection of pollen represents a valuable source of revenue for bee keepers.

The pollen trap preferably comprises a first, lower mesh through which the bees cannot pass; a second, upper mesh through which the bees can pass but which will contact the bees as they pass through; an opening formed between the upper and lower mesh and communicating with the entrance of the hive; a pollen drawer to fit in the space between the inclined partition and the lower mesh and adapted to be spaced slightly from the front of the hive to define a passageway from the hive entrance to the openings between the mesh. The arrangement is such that any bee entering the hive must pass through the entrance, between the interior of the front wall of the bottom section of the exterior of the front of the pollen tray, through the opening between the lower and upper mesh, through the upper mesh and into the hive section. Pollen pellets are removed from the hind legs of the bee as it passes through the upper mesh. The pollen falls into the pollen drawer.

The inner cover may be simply adapted to act as a feeder or as a water container by, extending the walls upwardly, if necessary, and by providing an opening in an inner wall to enable the bees to feed on syrup. The syrup or water may be placed on the base of the inner cover. The feeding of syrup to bees can be essential at certain times of the year when their natural food supply is not available in adequate amounts. The supplying of water can be essential in arid regions.

A pad, for example of a foamed plastic material, can be positioned on the base of the inner cover to assist insulation. The same foam pad will normally fit inside the inner lid so that when the inner cover is used as a feeder the foamed pad can be stored in the inner lid to keep the syrup in the feeder warm.

In a particularly preferred aspect the invention provides a two queen hive. The two queen hive comprises a bottom section having a front wall, a rear wall and two side walls; inclined partitions extending upwardly from the front and rear walls to meet at about the centre of the top of the side walls to define a first space beneath the partitions and a second space above the partitions; a dividing wall mounted on the inclined partitons, substantially parallel to the side walls, to divide the second space into a first and a second chamber, each chamber having a front wall, a rear wall, an exterior side wall and the common dividing wall on top of the inclined boards; a closeable bee entrance in each front wall; a closeable ventilation opening in all other walls except the dividing wall including at least one vent in each side wall communicating the first space with the exterior of the hive and a closeable ventilation opening in each rear wall to communicate the second space in each chamber with the exterior of the hive; internal vents in the side walls of the bottom section to permit air flow between the first space and the second space; a brood chamber over each of the first and second chambers of the bottom section, each brood chamber comprising a double side wall of an outer and an inner wall spaced from each other to define a ventilation channel between them; front and back walls each comprising a spaced outer and inner wall defining a ventilation channel, and a central dividing wall between the two brood chambers; an opening in the dividing wall to permit air circulation between the brood chambers and a mesh in said opening to prevent bees passing between the brood chambers; a queen excluder above each brood chamber, through which all bees except the queen can pass at least one hive section extending over the combined area of the two brood chambers above said excluders, and comprising spaced inner and outer walls defining ventilation channels, each ventilation channel aligned with a ventilation channel in the brood chamber below; the front inner and back inner wall of each brood chamber and the hive section being spaced below the upper edge of the corresponding outer wall to provide a means of suspending hive frames; a closeable entrance in at least one wall of each hive section; a top section for each half of the hive and comprising: (i) an inner cover having inner and outer walls to define ventilation channels around its periphery to communicate with the hive section below, the channels at the sides of the inner cover aligning with the ventilation channels in the hive section below, a base in the inner cover adjacent the lower edges of the inner walls; (ii) a reversible inner lid comprising a flat board having first and second sides; projections formed on the first side; ventilation openings around the periphery of the inner lid to align with the channels in the inner cover; an upstanding wall formed on the second side to align with the inner walls on the inner cover below and to space said second side away from the inner cover to define ventilation openings at the top of the ventilation channels; (iii) an outer lid common to both halves of the hive and comprising a top having walls to define an area larger than the combined areas of one side of each of the inner lids whereby the outer lid can be moved in the direction of the wind direction in order to facilitate ventilation, the outer lid being locatable on the projections on the inner lids or the walls of said inner lids depending on the ventilation required.

It is desirable that the two halves of the hive be kept independent apart from the common hive sections and that the entrances to each half of the hive be on opposite sides of the hive. The hive sections (or honey supers as they are also called) are common to both hives, that is both bees in both colonies have common access to the honey supers. However, the mesh queen excluder must be kept above each brood chamber, which is normally positioned below the honey supers, in order to prevent the queen bees from being in the same part of the hive. The queens are restricted by this means to the brood chamber.

It is desirable that each half of the hive be provided with a pollen trap as described above.

Desirably the halves of the hive are joined to each other by latches and the corners of each separate half are adapted, for example by being formed with interengageable corners, to join with the adjacent half of the hive.

BRIEF DESCRIPTION OF THE DRAWINGS

The invention is illustrated, merely by way of example, in the accompanying drawings in which:

FIG. 1 is a general view of the exterior of a hive according to the present invention;

FIG. 2 is a section along the line 2—2 in FIG. 1;

FIG. 3 is an exploded view of the hive of FIGS. 1 and 2.

FIG. 4 is a general view of a two queen hive according to the invention;

FIG. 5 is a view along the line 5—5 in FIG. 4;

FIG. 6 is a view along the line 6—6 in FIG. 5;

FIG. 7 is a detail showing the joining of the two halves of the hive in FIG. 4; and FIG. 8 is a view along the line 8—8 in FIG. 4.

DESCRIPTION OF THE PREFERRED EMBODIMENTS

Referring to the drawings FIGS. 1 to 3 illustrate a preferred embodiment of a first aspect of the present invention. FIGS. 1 to 3 illustrate a bee hive comprising a bottom section 2 having a removable front wall 4, a removable rear wall 6 and side walls 8. There are bee entrances 10 (see FIG. 2) formed in the front wall 4 closeable by pivotal doors 12. There are ventilation openings 14 in all the other walls of the bottom section 2 and 11 those ventilation openings are closeable by doors 16 as illustrated particularly in FIG. 1.

The bottom section 2 is provided with inclined partitions 18 extending upwardly from the front and rear walls 4 and 6 to meet at about the centre of the top of the side walls 8-see particularly FIG. 2. The inclined partitions 18 are supported by runners 20 extending across the hive between the side walls 8. The inclined partitions 18 divide the space in the bottom board 2 to a first space 22 beneath the inclined boards and a second space 24 above the partitions 18. The partitions 18, spaces 22 and 24 and ventilation openings 14 in the side walls 8 (which, when open, communicate first space 22 with the exterior of the bottom section 2) play an important part in the excellent ventilation achieved in the hive as illustrated in FIGS. 1 to 3.

There are vents 26 that communicate space 22 and space 24. Vents 26 can simply take the form of recesses cut into the side walls 8 or an additional layer 28-as shown particularly in FIG. 3-can be attached to the side wall 8 and provided with an opening 30. Vents 26 are closeable by a mesh 32 to prevent bees from moving between the spaces 22 and 24. Vents 14 in the rear wall 6 communicate the second space 24 with the exterior of the hive.

All the ventilation openings 14 are closed with mesh 34 to prevent the bees using those ventilation openings 14 as entrances and to prevent predators entering through the ventilation openings 14.

The front wall 4 and rear wall 6 are removable by providing the bottom section 2 with upper runners 36 along the upper edges of the front wall 4 and the rear wall 6. Upper runners 36 are shaped at 38 to form a co-operating joint with the front walls 4 and 6. Similarly the base 7 of the bottom section 2 is shaped to correspond with the lower edges of the removable front wall 4 and the removable rear wall 6 to the bottom section 2. As illustrated particularly in FIG. 3 a simple clip 40, pivotally mounted in the end of a side wall 8 and pivotable to contact the exterior of the front wall 4 or the rear wall 6, can be used to make the location of the front walls 4 and rear walls 6 completely positive.

The ventilation openings 14 formed in the rear wall 6 do not pass directly into the hive. Blanking pieces 42 are positioned in the interior of the hive so that when the bees are in the hives they cannot see daylight from within. Bees are prone to leave the hive when they can see light outside.

Above the bottom section 2 is a hive section 44. Only one such section is shown but it will be understood that as many hive sections as the bee keeper thinks necessary can be installed. Each hive section has side walls 45 made up of inner walls 46 and outer walls 48. Walls 46 and 48 are spaced from each other to define narrow channels 50 at the sides of the hive section 44 that, at their bottoms, are open to the second space 24 above the inclined boards 18 in the bottom section 2. The inner walls 46 may be spaced from the outer walls 48 by the use of simple blocks 52 not shown in FIGS. 1 to 3 but as shown in FIG. 5.

End walls 53 of hive section 44 have shoulders 54 spaced downwardly from their tops 55. This is to permit, as illustrated particularly in FIG. 2, the hanging of conventional frames 56 by the extensions 58 as has been well known in the bee keeping art for many years.

There is an entrance 60 in one end wall 53 of the hive section 44. That entrance 60 is provided with a pivotal door 62 similar to door 12 closing the bee entrance 10 in the bottom section 2. It has been found that the bees often like to land in the hive section rather than at the entrance to the bottom board. Entrances 10 and 60 are provided with landing platforms 64. These are considered desirable, particularly in colder climates, because a bee need not use energy in hovering prior to entering the hive but can land on landing platform 64 and then enter the hive through the adjacent entrance.

It is necessary to remove the hive sections 44 from the bottom section 2 on occasions so that a handle 66 is provided on the outer wall 53 opposite the outer wall containing the door 62. The handle 66 is in fact a duplicate of the landing platform 64.

The illustrated embodiment is shown with an inner cover generally indicated at 68 - see particularly FIG. 3. Inner cover 68 comprises inner walls 72 and outer walls 74. These inner walls 72 and outer walls 74 of the inner cover 68 define channels 76 that communicate with the ventilation channels 50 in the hive section 44 below.

The inner cover 68 has a base 78 attached to the inner walls 72. As perhaps more clearly shown in FIG. 2 there is a passageway 80 in one inner wall 72 to enable the inner cover to be used as a feeder. The upper end of ventilation channels 76 are closed with mesh 82 through which the bees cannot pass. Opening 80 in part of one inner wall 72 communicates a ventilation channel 76 with the interior of the inner cover 68. Mesh 82 extends at 84 over the opening 80 and downwardly to adjacent the base 78 of the inner cover 68. There is a slide 86 positioned adjacent the opening 80. This slide permits syrup to flow from the interior of the inner cover 68 to the passage way 80. The bees can thus pass from the hive section 44, through channel 76, through the passageway 80 and feed on the syrup contained in the passageway 80 without there being a fear of their being drowned in the syrup. Opening 88 in the base of the slide 86 facilitates the flow of syrup. However, when the syrup has been largely removed by the bees, slide 86 can be removed to enable the bees to enter the interior of the inner cover to clean it out.

A recess 90 and $\frac{1}{8}''$ in the inner cover ensures that the proper bee space of $\frac{3}{8}''$ is maintained. The frames 56 are spaced below the upper edges of walls 53 in hive sections 44 by about 174" in accordance with conventional practice. These two measurements provide the proper bee space of $\frac{3}{8}''$.

An inner cover lid 70 on top of inner cover 68 comprises a flat board having a first side 92 formed with projections 94 -see particularly FIG. 1. In the position shown in FIG. 2 the projections 94 serve to space an outer cover 96 to define a ventilation space betweeen the inner surface of the outer cover 96 and the first surface 92 of the inner cover 70. However, when the inner cover 70 is reversed (as shown in the exploded view, FIG. 3), the periphery 98 of the inner cover fits closely on top of the ventilation channels in the inner cover 68. It should be noted, particularly, from FIGS. 1 and 3, that there are openings 100 around the periphery 98 of the inner cover 70. This is so that when the inner cover 70 is positioned as shown in FIG. 3 there is still ventilation to enable the air in the ventilation channels 50 and 76 to escape from the hive above as to be drawn downwardly and out.

The second side 102 of the inner cover 70 is formed with a wall 104 shown most clearly in FIGS. 2 and 3. Wall 104 fits on the inner wall 72 of the inner cover 68 and, particularly as shown in FIGS. 1 and 2, provides relatively large ventilation openings 106 all around the upper periphery of the inner lid 70.

In addition, to assist general ventilation, there is a central opening 108 in the inner lid 70.

The inner lid 70 is located on the inner cover 68 by the provision of pegs 110 shown particularly in FIG. 3 attached to the inner wall 72 of the inner cover 68 to engage in holes 112 that extend through the inner lid 70 including, as shown in FIG. 3, through the wall 104. This means of location is effective whether the inner lid 70 is in the position shown in FIG. 1 or in the position shown in FIGS. 2 and 3.

The hive, as illustrated in FIGS. 1 to 3, is completed by an outer cover 96. Inner cover 68, inner lid 70 and outer cover 96 make up the top section of the hive. Outer cover 96 comprises a top 114 having walls 116 extending downwardly from it. The area of the top 114 defined by the walls 116 is larger than the area of the inner cover 70 upon which the outer cover 96 sits. This is to permit the outer cover 96 to be moved in the wind direction to ensure that the wind does not cause drafts through the hive but acts as an extracting medium to extract stale air from the hive on the leeward side of the hive by the Venturi effect of the wind. The position for the outer cover 96 shown in FIG. 2 is a middle position useful on a non-windy day. On a windy day the outer cover 96 can simply be pushed, for example in the direction of the arrow A in FIG. 2 if that is the wind direction, so that the wall 116 in the windward direction is pushed against the hive wall and the wall 116 on the leeward side of the hive is relatively remote from the hive.

The illustrated hive is provided with a pollen trap generally indicated at 118 - see FIG. 2 and 3. The pollen trap 118 comprises a frame 120, usually of wood. On the lower side of the frame 120 is provided a first mesh 122 the mesh size of which is such that the bees cannot pass through it. On the upper side of the frame 120 is a second mesh 124 through which the bees can pass but only in such a way that in doing so their bodies must contact the mesh so that pollen is knocked from the bees legs. There is an opening 126 between the first mesh 122 and the second mesh 124. There is a pollen drawer 128 shaped to fit within the space 24 above the inclined partitions 18 adjacent the entrance 10 of the bottom board 2. The pollen drawer 128 has a front wall 130 spaced slightly from the front wall 4 of the bottom board 2. This spacing defines a passageway 132 that communicates the entrance 10 in the front wall 4 with the openings 126 between the meshes 122 and 124. The arrangement is such that a bee entering the hive at the entrance 10 must pass through the been entrance 10 through the passageway 132 through the opening 126 between the meshes 122 and 124 through the second, coarser mesh 124 and into the hive section 44. In passing through the second mesh pollen is knocked from the legs of the bees, falls through the mesh 122 and into the pollen drawer 128. The pollen drawer 128 may be held lightly in place by clips 134 and may be provided with a handle 136. Handles 136 should project about ⅜" to ensure the proper space between the wall 130 and the front wall 4. The trap may be removed by removing the front wall 4 of the bottom section 2 and then simply removing the pollen drawer 128 by use of the handle 136 without disturbing the meshes 122 and 124 or the frames 120 upon which the meshes are supported.

Although not illustrated in FIGS. 1 to 3 the hive of FIGS. 1 to 3 may be provided with a queen excluder as shown in FIG. 6 and discussed below. The queen excluder is a means of restricting the queen bees to the brood section of the hive. Such a device is known in the bee keeping art and simply comprises a mesh or grid through which all the bees except the queen can pass. The queen has a larger thorax than all other bees and thus a mesh or grid size is selected to exclude only her. The use of such an excluder is well known in bee keeping.

Similarly, as described below with regard to the two queen system, the bee hive shown in FIGS. 2 and 3 may be provided with a division board adapted to be received between two sections 44 of the bee hive. Again such division boards are known and include a closeable bee escape so that the bees may pass through to leave a section of the hive but cannot then return. The division board has a variety of uses as described below.

The embodiment of the invention illustrated in FIGS. 4 to 8 show features of the two queen system according to the present invention. It should be emphasized that the two queen system and the one queen system illustrated in FIGS. 1 to 3 have a large number of features in common, but the inventive nature of the present invention facilitates greatly the formation of a two queen system, particularly a side by side system which avoids the disadvantages in prior art two queen systems of excessive height and difficulties in ventilation.

In the following description of the embodiment of FIGS. 4 to 8 the same reference numerals are indicated for the same parts of the hives as shown in FIGS. 1 to 3. The bottom section 2 of the hive of FIGS. 4 to 6 is formed with a dividing wall 138 mounted on the inclined partitions 18. Dividing wall 138 is substantially parallel to the side walls 8 and divides the bottom section 2 into a first chamber 140 and a second chamber 142. Each chamber 140 and 142 has a front wall 4, a rear wall 6 and an exterior side wall 8. The fourth wall of each chamber is provided by the dividing wall 138. There is a closeable bee entrance 10 in each chamber 140 and 142. There are closeable ventilation openings 14 in all walls except the dividing wall 138. Again the vents 14 are arranged so that those in the side walls communicate the exterior of the hive with the first space 22 and those in the end walls communicate the exterior of the hive with the second space 24. Similarly, vents 26 again communicate first space 22 beneath the inclined boards 18, and the second space 24, above the inclined partitions 18. There is a brood chamber 144 above the bottom section 2 on each side of the hive; that is there are two brood chambers 144, one above the first chamber 140 of the bottom section 2 and the other above the second chamber 142 of the bottom section 2. Brood chambers 144 are formed separately and a detail of their formation is shown in FIG. 7. FIG. 7 illustrates that the corners of the brood chambers 144 are shaped to correspond at 146 to ensure the location of the two brood chambers 144. A simple latching arrangement comprising a plate 148 pivotally mounted on a stud 150 provided with a recess 152 to engage on a pin 154 is a simple and efficient means of providing the location.

The brood chambers 144 are formed with ventilation channels in all outer walls - not just the side walls. That is it has inner and outer walls corresponding to the inner and outer walls 45 and 46 described above for the side walls of hive section 44. A brood chamber is the same in structure as a hive section or honey super but the brood chamber is used for developing eggs laid by the queen and for developing the brood and not for the storing of honey. The brood chamber is normally provided with a queen excluder 155 - as discussed below - above it to prevent the queen leaving the brood chamber and laying eggs in a honey super.

There is a central dividing wall 156 between the brood chambers 144. It has been found desirable to provide the central walls or dividing wall 156 with a mesh 158. Thus each queen is restricted to a single brood chamber 144 but there is communication of air between the two chambers. However, bees cannot pass through the mesh 158.

Above the brood chamber 144 are arranged hive sections 44 similar to those described above, but the sections in the two queen hive have double walls all round and they are common to both halves of the hive so that all bees, except the queens, have access to them.

It is also desirable, as in the embodiment shown in FIGS. 1 to 3, to provide entrances 60 in the hive sections 44. Entrances 60 are provided with doors 62.

It is also desirable to provide each half of the two queen hive with a division board for the purposes described below. A division board is shown generally at 160. Each part 140 and 142 of the bottom section 2 of the two queen hive is also desirably provided with a pollen trap 118. Similarly the two-queen hive has a top section for each half of the hive. That top section comprises an inner cover 68 and an inner lid 70 as described above. Again it is desirable to adapt the inner cover 68 as a feeder. The inner lid 70 is reversible as described above. A common outer cover 96 is also required. Again it is movable depending on wind direction.

FIGS. 5 and 6, particularly the latter, show details of the queen excluder 155 and the division board 160. As indicated in those drawings the queen excluder 155 comprises a wooden frame 162 that aligns with the outer walls 44 of the hive section above and with the similar outer walls of the brood chamber 144 below. It should be noted, particularly from FIG. 6, that the two queen hive is provided with two queen excluders 155 and that the inner walls of the frames of the queen excluder 155 are aligned with the dividing walls 156 of the brood chambers below. The queen excluder 155 has rods 164 running between the frames 162 and spaced in such a way that the queens cannot pass through but all other bees can.

The division board 160 comprises a flat board 166 set in a frame 168. There are openings 170 around the periphery of the board 166 to align with the ventilation channels 50 in the hive sections 44 above and beneath the division board 160. These openings 170 are closed with mesh on each side of board 166 through which the bees cannot pass. Mesh on each side is needed. The queens can sting each other through a single mesh.

The division boards 160 are provided with a bee escape 172 in the form of an opening controlled by a one way gate 174. The one way gates 174 — shown on the top of the board 166 in FIG. 6 — are known in the art. The gates 174 comprise a metal housing fitted internally with a simple light weight spring steel member that the bees can push open from the inside, that is after they have moved through the opening in the board 160, but cannot reopen from the upper surface as shown in FIG. 6.

The division boards 160 are reversible and it should be noted in this regard that the board 166 is mounted off centre in the frame 168. Above the board 166 to the top of the frame 168 in FIG. 6 is a gap of about ¼". Beneath the board there is a gap of about ⅜".

In a position illustrated in FIG. 1, that is with the bee escape 174 upward the division board can be used to permit bees to escape from a section in order that the ripe honey supers, free of bees, may be removed from these sections. It is also useful in that position as a divider of bee colonies, as a divider under a nucleus and as a divider for raising queens.

In the closed position, that is with the bee escape 174 downward it can be used to provide pollen patties above the top of the frames 56 in the hive for spring build up of the hive and for brood rearing when a natural supply of pollen may be low.

The present invention provides an improved hive. In particular, experiments have indicated that the hive is well able to support a colony of bees in cold northern winters. However, in addition the hives are also excellent in summers as they avoid excessive heat build-up. The hives are ventilated in a manner unknown in prior art hives. The full reason for the excellent ventilation is not properly understood. However, the openings 14 in the bottom section 2 permit wind or air flow to pass through the hive and to draw out stale air. This is possible because of the communicating vents 14 between the first and second spaces 22 and 24. At the same time harmful drafts are not built up in the hive even in high winds.

The partitions 18 give the bottom section 2 a natural clustering space in that part of the space 24 not occupied by the pollen trap or, of course, when a pollen trap is not present. It has been found that bees do not build in this second space 24 but use it only as a clustering space. The reason for this is not understood. In the normal practice bees build in any space greater than ⅜" and seal off any space less than ¼". However, it has been found that they do not build in the first space 22 despite the fact that it is substantially greater than ⅜" in depth for most of its depth. Clustering space is essential to bees. With inadequate clustering space a colony will tend to swarm. Bees cluster (a) to keep warm (b) to produce wax used in making honeycomb and (c) to produce enzymes needed in breaking down relatively complex carbohydrates found in nectar into glucose and fructose. In the prior art clustering frames are provided but these take up space that could be occupied by frames carrying honey. In extensive experiments with hives according to the invention very little swarming was encountered and only one instance of building in space 24.

In the matter of the space of ⅜" — the so called bee space — it is pointed out that due regard is paid to this fact in the hives according to the present invention. However, a detail discussion of this matter is not included since any bee keeper will appreciate that any space left between component parts of the hive must be about ⅜".

It should be also pointed out that the greatly improved ventilation of the hives according to the present invention does not necessitate the use of the entrance of the hive for ventilation. It is used only as a bee entrance which permits better control of the ventilation of the hive. However it also makes the hive far easier to defend. In prior art hives, on warm days, the bee entrance had to be opened fully to permit ventilation. In the hives of the present invention all the vents are protected with mesh and a substantially constant, small opening can be used for the bee entrance. This can keep out predators such as wax moths, which are bigger than bees, but can also permit easier defence by the guard bees.

I claim:

1. A bee hive comprising:
   a bottom section having a removable front wall, a removable rear wall and two side walls;
   a closeable bee entrance in the front wall;
   inclined boards extending upwardly from the front and rear walls to meet at about the center of the top of the side walls to define a first space beneath the boards and a second space above the boards;
   internal vents in the side walls to permit air flow between the first space and the second space;
   at least one closeable vent in each side wall to communicate the first space with the exterior of the bottom section;
   at least one closeable vent in the rear wall to communicate the second space with the exterior of the bottom section;
   a hive section having (a) inner and outer side walls spaced to define ventilation channel at the sides of the hive section and (b) end walls;
   means on said end walls in said hive section to suspend a plurality of bee hive frames;
   a closeable entrance in at least one end wall of said hive body section;
   a top section comprising in combination;
   i. an inner cover having inner and outer walls to define an inner space and ventilation channels around its periphery to communicate with the hive section below, the channels at the sides of the inner cover aligning with the ventilation channels in the hive section below;
a base in the inner cover adjacent the lower edges of the inner walls;
ii. a reversible inner lid comprising a flat board having first and second sides;
projections formed on the first side;
ventilation openings around the periphery of the lid to align with the channels in the inner cover;
an upstanding wall formed on the second side to align with the inner walls on the inner cover below and to space said second side away from the inner cover to define ventilation openings at the top of the ventilation channels in the inner cover;
iii. an outer lid comprising a top having walls to define an area larger than the area of the inner lid whereby the outer lid can be moved in the direction of the wind direction in order to facilitate ventilation, the outer lid being supported by the projections of the inner lid or the wall of said inner lid depending on the ventilation required.

2. A bee hive as claimed in claim 1 in which each entrance has an adjacent landing platform.

3. A bee hive as claimed in claim 1 having a pollen trap associated with the bottom section, the trap comprising a first, lower mesh through which the bees cannot pass;
a second, upper mesh through which the bees can pass but which will contact the bees as they pass through;
an opening formed between the upper and lower mesh and communicating with the entrance to the hive;
a pollen drawer to fit in the space between the inclined board and the lower mesh and adapted to be spaced slightly from the front of the hive to define a passageway from the hive entrance to the opening between the mesh whereby any bee entering the hive must pass through the entrance, between the interior of the front wall of the bottom section and the exterior of the front of the pollen tray, through the opening between the lower and upper mesh, through the upper mesh and into the hive section, pollen being removed from the legs of the bee as it passes through the upper mesh.

4. A bee hive as claimed in claim 3 in which the front wall of the pollen trap is provided with handles so that it can be removed easily from the bee hive once the front of the bottom section has been removed and in which the upper and lower meshes are mounted on opposed sides of a frame;
projections adjacent the top of the bottom board to contact the frame and thus position the meshes in the upper part of the bottom section.

5. A bee hive as claimed in claim 1 in which the inner cover is adapted to act as a feeder to receive syrup or water in the inner space, on the base, by the provision of an opening in an inner wall to enable the bees to feed.

6. A bee hive as claimed in claim 5 in which the upper ends of the ventilation channels of the inner cover are closed with mesh through which the bees cannot pass;
a passageway formed in part of one inner wall to communicate a ventilation channel with the inner space and covered with the mesh extending to adjacent the base of the inner cover;
a slide positioned adjacent said passageway to permit syrup or water to flow from the inner space to said passageway;
said slide being removable so that, when the syrup level is low the bees can be allowed to enter the inner space to clean it out but said slide preventing the bees passing into the inner space when it is present.

7. A bee hive as claimed in claim 1 in which there is a central ventilation opening in the inner lid.

8. A bee hive as claimed in claim 1 including a brood chamber and a queen excluder positioned above the brood chamber to prevent a queen bee leaving the brood chamber said queen excluder comprising a mesh through which the queen cannot pass.

9. A bee hive as claimed in claim 1 including a divider adapted to be received between hive sections and comprising:
a board having a first and a second side;
openings at the periphery of the board to align with ventilation channels in adjacent hive sections;
a mesh on each side of each opening to prevent access through the openings;
a passage through the board having a closeable inlet on the first side and an outlet on the second side, said outlet being controlled by a gate that permits bees to pass only one way, from the first to the second side.

10. A bee hive as claimed in claim 9 in which the divider has a raised rim the rim standing about $\frac{1}{8}''$ above the first side of the board and about $\frac{1}{4}''$ above the second side of the board.

11. A bee hive providing a two queen side by side system, the bee hive comprising a bottom section having a front wall, a rear wall and two side walls;
inclined boards extending upwardly from the front and rear walls to meet at about the centre of the top of the side walls to define a first space beneath the boards and a second space above the boards;
a dividing wall mounted on the inclined boards, substantially parallel to the side walls, to divide the second space into a first and a second chamber, each chamber having a front wall, a rear wall, an exterior side wall and the common dividing wall on top of the inclined boards;
a closeable bee entrance in each front wall;
a closeable ventilation opening in all other walls except the dividing wall including at least one vent in each side wall communicating the first space with the exterior of the hive; and a closeable ventilation opening in each rear wall to communicate the second space with the exterior of the hive;
internal vents in the side walls of the bottom section to permit air flow between the first space and the second space;
a brood chamber over each of the first and second chambers of the bottom section, each brood chamber comprising a double side wall of an outer and an inner wall spaced from each other to define a ventilation channel between them; front and back walls each comprising a spaced outer and inner wall defining a ventilation channel and a central dividing wall between the two brood chambers;
an opening in the dividing wall to permit air circulation between the brood chambers and a mesh in said opening to prevent bees passing between the brood chamber;
a queen excluder above each brood chamber, the excluder being such that the queen cannot pass through it;

at least one hive section extending over the combined area of the two brood chambers above said excluders and comprising spaced inner and outer walls defining ventilation channels, each ventilation channel aligned with a ventilation channel in the brood chamber below;

the front inner and back inner wall of each brood chamber and the hive section being spaced below the upper edge of the corresponding outer wall to provide a means of suspending hive frames;

a closeable entrance in at least one wall of each hive section;

a top section for each half of the hive and comprising:
 i. an inner cover having inner and outer walls to define ventilation channels around its periphery to communicate with the hive section below, the channels at the sides of the inner cover aligning with the ventilation channels in the hive section below an inner space and; a base in the inner cover adjacent the lower edges of the inner walls;
 ii. a reversible inner lid comprising a flat board having first and second sides;
projections formed on the first side;
ventilation openings around the periphery of the inner lid to align with the channels in the inner cover;
an upstanding wall formed on the second side to align with the inner walls on the inner cover below and to space said second side away from the inner cover to define ventilation openings at the top of the ventilation channels;
 iii. an outer lid common to both halves and comprising a top having walls to define an area larger than the combined areas of the inner lids whereby the outer lid can be moved in the direction of the wind direction in order to facilitate ventilation, the outer lid being locatable on the projections of the inner lid or the walls of said inner lids depending on the ventilation required.

12. A bee hive as claimed in claim 11 in which the entrances in each half of the hive are on opposite sides of the hive.

13. A bee hive as claimed in claim 11 in which each entrance has an adjacent landing platform.

14. A bee hive as claimed in claim 11 in which there is a pollen trap in each half of the hive, adjacent the entrance in each part of the bottom section each pollen trap comprising a first, lower mesh through which the bees cannot pass, a second, upper mesh through which the bees can pass but which will contact the bees as they pass through it;

an opening formed between the upper and lower mesh and communicating with the entrance to the respective chamber of the bottom section;

a pollen drawer to fit between the inclined board and the lower mesh and adapted to be spaced slightly from the front of the chamber of the bottom section to define a passageway from the bottom section entrance to the opening between the mesh whereby any bee entering the hive must pass through an entrance, between the interior of a front wall of a bottom section chamber and an exterior of the front of a pollen tray, through the opening between the lower and upper meshes, through an upper mesh and into the hive section above, pollen being removed from the legs of the bee as it passes through the upper mesh.

15. A bee hive as claimed in claim 11 in which separate halves of the hive are joined to each other by latches and in which the corners of each separate half are adapted to engage with the corresponding corners of the adjacent half of the hive.

16. A bee hive as claimed in claim 11 in which each inner cover is adapted to act as a feeder to receive syrup in the inner space, on the base, by the provision of an opening in an inner wall to enable the bees to feed.

17. A bee hive as claimed in claim 16 in which the upper ends of the ventilation channels of each inner cover are closed with mesh through which the bees cannot pass;

a passageway formed in part of one inner wall to communicate a ventilation channel with the inner space of the inner cover and covered with mesh extending to adjacent the base of the container;

a slide positioned adjacent said passageway to permit syrup to flow from the container to said passageway;

said slide being removable so that, when the syrup level is low the bees can be allowed to enter the inner space to clean it out but said slide preventing the bees passing into the inner space when it is present.

18. A bee hive as claimed in claim 11 including a divider board for each half of the hive adapted to be received between hive sections of each half of the hive and comprising:

a board having a first and a second side;

openings at the periphery of the board to align with ventilation channels in adjacent hive sections;

a mesh on each opening to prevent access through the opening;

a passage through the board having a closeable inlet on the first side and an outlet on the second side, said outlet being controlled by a gate that permits bees to pass only one way, from the first to the second side.

19. A bee hive as claimed in claim 18 in which each divider has a raised rim, the rim standing about $\frac{1}{4}$" above the first side of the board and about $\frac{1}{4}$" above the second side of the board.

20. A bottom section for a bee hive, the bottom section comprising:

a removable front wall, a removable rear wall and two side walls;

a closeable bee entrance in the front wall;

inclined boards extending upwardly from the front and rear walls to meet at about the center of the top of the side walls to define a first space beneath the boards and a second space above the boards;

internal vents in the side wall to permit air flow between the first space and the second space;

at least one closeable vent in each side wall to communicate the first space with the exterior of the bottom section;

at least one closeable vent in the rear wall to communicate the second space with the exterior of the bottom section.

21. A top section for a bee hive, the top section comprising in combination:
 i. an inner cover having inner and outer walls to define an inner space able to receive an insulating pad and ventilation channels around its periphery to communicate with a part of the hive below, a base in the inner cover adjacent the lower edges of the inner walls; and ii. a reversible inner lid comprising a flat board having first and second sides;

projections formed on the first side;

ventilation openings around the periphery of the lid to align with the channels in the inner cover;

an upstanding wall formed on the second side to align with the inner walls on the inner cover below and to space said second side away from the inner cover to define ventilation openings at the top of the ventilation channels in the inner cover.

22. A top section as claimed in claim 21 further including:

an outer lid comprising a top having walls to define an area larger than the area of the inner lid whereby the outer lid can be moved in the direction of the wind direction in order to facilitate ventilation, the outer lid being supported by the projections of the inner lid or the wall of said inner lid depending on the ventilation required.

23. A top section as claimed in claim 21 in which the inner cover is adapted to act as a feeder to receive syrup or water in the inner space, on the base, by the provision of an opening in an inner wall to enable the bees to feed.

24. A top section as claimed in claim 23 in which the upper ends of the ventilation channels of the inner cover are closed with mesh through which the bees cannot pass;

a passageway formed in part of one inner wall to communicate a ventilation channel with the inner space and covered with the mesh extending to adjacent the base of the inner cover;

a slide positioned adjacent said passageway to permit syrup or water to flow from the inner space to said passageway;

said slide being removable so that, when the syrup level is low the bees can be allowed to enter the inner space to clean it out but said slide preventing the bees passing into the inner space when it is present.

* * * * *

UNITED STATES PATENT OFFICE
CERTIFICATE OF CORRECTION

PATENT NO. : 4,135,265
DATED : January 23, 1979.
INVENTOR(S) : HERMAN VAN DE KERKHOF It is certified that error appears in the above-identified patent and that said Letters Patent are hereby corrected as shown below:

(76) Inventor: HERMAN VAN DE KERKHOF

Signed and Sealed this

First Day of May 1979

[SEAL]

Attest:

RUTH C. MASON
Attesting Officer

DONALD W. BANNER
Commissioner of Patents and Trademarks